United States Patent [19]

Andrews

[11] 3,754,159

[45] Aug. 21, 1973

[54] AUTOMATIC FOCUS CONTROL CIRCUIT FOR A CATHODE RAY OSCILLOSCOPE

[75] Inventor: R. Eugene Andrews, Portland, Oreg.

[73] Assignee: Tektronix, Inc., Beaverton, Oreg.

[22] Filed: Dec. 10, 1971

[21] Appl. No.: 206,617

[52] U.S. Cl. .............................................. 315/31 R
[51] Int. Cl. .............................................. H01j 29/56
[58] Field of Search .................. 315/26, 22, 30, 31; 179/15 R

[56] References Cited

UNITED STATES PATENTS 3,151,271 9/1964 Maron .................................. 315/26
3,622,836 11/1971 Nielsen ................................ 315/22

*Primary Examiner*—Carl D. Quarforth
*Assistant Examiner*—J. M. Potenza
*Attorney*—Adrian J. La Rue

[57] ABSTRACT

An improved automatic focus control circuit for a multi-trace cathode ray oscilloscope whose intensity levels can be controlled independently is disclosed. The automatic focus control circuit adjusts the voltage to be applied to the focus electrode of the cathode ray tube to the optimum level for a selected trace according to the intensity control setting thereof immediately after the previous sweep waveform reaches the retrace level.

9 Claims, 8 Drawing Figures

PRIOR ART

INVENTOR:
R. EUGENE ANDREWS

BY: Adrian J. LaRue
ATTORNEY

INVENTOR:
R. EUGENE ANDREWS

BY: [signature]
ATTORNEY

INVENTOR:
R. EUGENE ANDREWS

BY: Adrian J. LaRue

ATTORNEY

INVENTOR:
R. EUGENE ANDREWS

BY: [signature]
ATTORNEY

AUTOMATIC FOCUS CONTROL CIRCUIT FOR A CATHODE RAY OSCILLOSCOPE

BACKGROUND OF THE INVENTION

The present invention relates to an automatic focus control circuit for a multi-trace cathode ray oscilloscope whose intensity levels can be selected independently.

When a plurality of traces are displayed on the same screen of a cathode ray tube by a time sharing manner, the intensity level of each trace can better be controlled independently without degrading the focus condition, especially if the sweep rates thereof are different from one another, so that all traces will have the same visual intensity level. It is known that the optimum focus voltage to be applied to the focus electrode of the cathode ray tube is non-linear relative to the setting of the intensity control level or the grid bias voltage of the cathode ray tube. That is, there is cumbersome interaction between the intensity control and focus control of an electrostatic focus cathode ray tube.

In order to maintain automatically the focus voltage to the optimum condition regardless of different intensity levels for a plurality of traces displayed sequentially by the same electron gun, it is proposed to vary nonlinearly the focus voltage according to the intensity level of the selected trace. However, the conventional automatic focus voltage controlled in response to the Z-axis signal tends to cause considerable time delay, thus, in turn providing poor focus especially at high sweep rates such, for example, as a few nanoseconds per centimeter. Thus, a fast response amplifier is needed for amplifying such focus control signal.

SUMMARY OF THE INVENTION

According to the present invention, the focus voltage is previously switched to the optimum level for a selected trace upon starting the retrace or the blanking period of the preceding sweep. The blanking period is selected even at high sweep rates such that it is longer than the risetime of the amplifier for amplifying such focus control signal. This allows the focus voltage remaining at the optimum level when the following sweep is triggered by the input trigger pulse. As a result, even a slow response amplifier can be employed for amplifying such focus control signal without employing an expensive and complicated high response amplifier of the conventional automatic focus control circuit. This is achieved by employing an additional steering gate which may be a switching circuit being actuated by the sweep steering signals which are responsive to a plurality of sweep generators rather than by obtaining the focus voltage from the Z-axis amplifier.

It is therefore one object of the present invention to provide an improved automatic focus control circuit for a multi-trace oscilloscope, wherein the focus voltage for each sweep is applied to the focus electrode of the cathode ray tube upon starting the blanking period of the preceding sweep until the termination of the unblanking period of the selected sweep.

It is another object of the present invention to provide an automatic focus control circuit for a multi-trace oscilloscope, wherein a slower response and less expensive amplifier than the conventional one can be employed for amplifying the focus voltage.

It is still another object of the present invention to provide an improved DC coupling and bias circuit for DC coupling across a large DC voltage value while introducing minimum signal distortion or undesirable modulation.

It is a further object of the present invention to provide an amplifier whose bias current is proportional to the amplitude and frequency of the output thereof.

The subject matter of the present invention is particularly pointed out and distinctly claimed in the following description. The invention, however, both as to organization and method of operation, together with further advantages and objects thereof, may best be understood by reference to the following description taken in connection with accompanying drawings wherein like reference characters refer to like elements.

DETAILED DESCRIPTION OF PREFERRED EMBODIMENTS

The detailed description of the present invention will be given hereinafter by reference to the accompanying drawings illustrating one example of the prior arts and preferred embodiments of the present invention.

Figure 1:
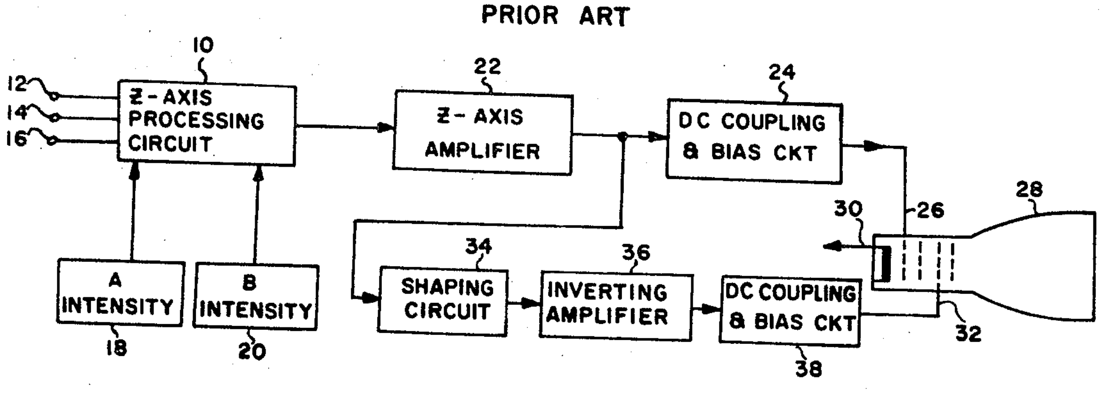
FIG. 1 is a block diagram of one example of the conventional automatic focus control circuit.

FIG. 1 illustrates a block diagram of one example of the conventional automatic focus control circuit for a dual-trace oscilloscope. In FIG. 1, a Z-axis processing circuit 10 is a signal summing circuit including, for example, a grounded base transistor amplifier input stage. Although it is not shown in FIG. 1, an oscilloscope utilizing this automatic focus control circuit is assumed to have a pair of sweep generators (hereinafter referred to as A and B sweeps) which can be operated independently or alternatively by switching the two generators as well as in a well known delay sweep mode. A and B gate signals and an external intensity modulation signal are applied to input terminals 12, 14 and 16 of the Z-axis processing circuit 10.

A and B intensity control circuits 18 and 20 are connected to the Z-axis processing circuit 10 for providing intensity control signals thereto when the A and B gate pulses are applied to the input terminals 12 and 14 respectively. In this example, the A and B intensity control circuits 18 and 20 can independently be controlled for varying the intensity levels of the A and B traces such that both A and B traces will have the same visual intensity level or either A or B trace will be displayed. The external intensity modulation signal is provided to modulate the trace intensity from a desired external signal source. The A and B gate pulses are produced by the A and B sweep generators respectively while they are generating ramp signals. Accordingly, the intensity control signal from the A intensity control circuit 18 and the external intensity modulation signal are processed by the Z-axis processing circuit 10 whenever the A gate pulse is applied to the input terminal 12. On the other hand, the external intensity modulation signal and the intensity control signal from the B intensity control circuit 20 are processed whenever the B gate pulse is applied to the input terminal 14.

A Z-axis amplifier 22 amplifies the output from the Z-axis processing circuit 10. A DC coupling and bias circuit 24 is a DC restorer for applying a DC bias voltage responsive to the output from the Z-axis amplifier 22 to control grid 26 of a cathode ray tube 28. The DC coupling and bias circuit 24 is adjusted such that the control grid 26 is held at a little lower voltage than the cut-off of the cathode ray tube 28 when the intensity control circuits 18 and 20 are set to the minimum level. A cathode 30 is connected to a predetermined voltage source, for example, of −3KV. The voltage difference between the control grid 26 and the cathode 30 of the cathode ray tube 28 or the bias voltage thereof mainly determines the visual intensity of the traces displayed.

A focus voltage applied to a focus electrode 32 of the cathode ray tube 28 is derived from the Z-axis amplifier 22 via a shaping circuit 34, an inverting amplifier 36 and a DC coupling and bias circuit 38. As is discussed in greater detail in FIG. 6, the optimum focus voltage changes nonlinearly relative to the grid bias voltage of the cathode ray tube 28. Moreover, the optimum focus voltage decreases when the intensity or the beam current is increased. Thus, the shaping circuit 34 and the inverting amplifier 36 are employed to obtain the optimum focus voltage. The DC coupling and bias circuit 38 is a DC restorer similar to the DC coupling and bias circuit 24, which controls the DC level of the focus voltage such that the optimum focus is achieved regardless of the settings of the intensity control circuits 18 and 20.

Figure 2:
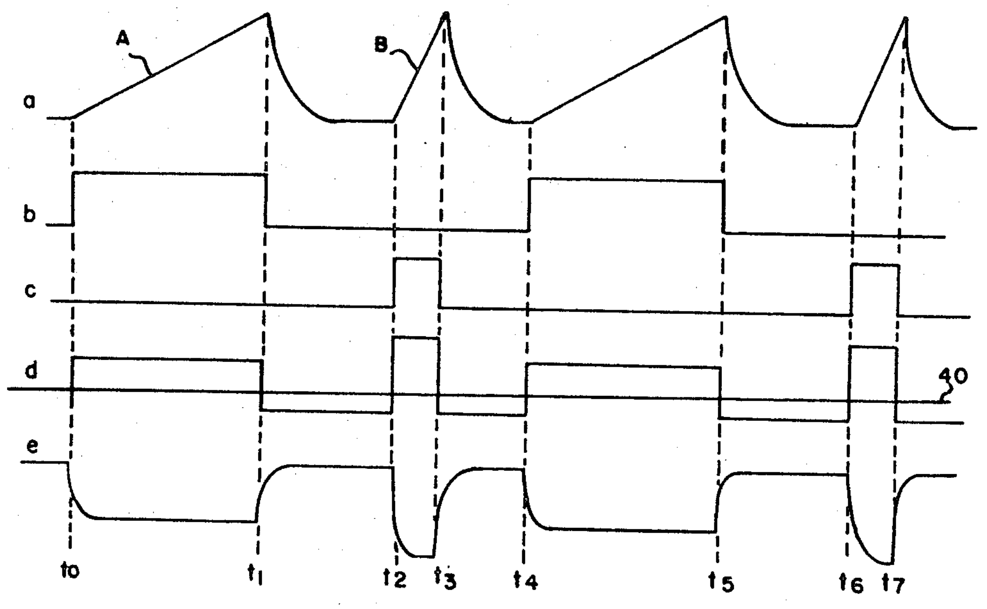
FIG. 2 shows waveforms for illustrating the operation of the conventional automatic focus control circuit exemplified in FIG. 1.

FIG. 2 illustrates waveforms for explaining the operation of the conventional automatic focus control circuit shown in FIG. 1. Waveform a illustrates output ramp signals from the A and B sweep generators which are generated alternatively. In FIG. 2, the sweep rate of the B sweep generator is selected at a considerably faster sweep rate than that of the A sweep generator. Waveform b is an A gate signal from the A sweep generator, which corresponds to the generation of the A sweep generator. Waveform c is a B gate signal from the B sweep generator, which corresponds to the generation of the B sweep generator. The time duration of the A and B gate signals is equivalent to the time duration of the A and B ramp signals and changes according to the sweep rate of each sweep generator. Waveform d is the intensity control voltage waveform or the Z-axis output to be applied to the control grid 26 of the cathode ray tube 28. In waveform d, it is understood that the A intensity level is selected to a lower value than the B intensity level. A reference line 40 represents the cut-off voltage of the electron beam of the cathode ray tube 28. Thus, the control grid 26 is maintained at the A intensity level higher than the cut-off voltage 40 during the periods *to-to-tl t*1 and *t*4-*t*5, at the B intensity level higher than the cut-off voltage 40 and also the A intensity level during the periods *t*2-*t*3 and *t*6-*t*7 and at a level lower than the cut-off voltage 40 during the periods *t*1-*t*2, *t*3-*t*4 and *t*5-*t*6 or the intervals between these two sweeps.

Waveform e represents a focus control voltage applied to the focus electrode 32. Even if fast response amplifiers may be employed as the shaping circuit 34 and the inverting amplifier 36, transient such, for example, as roll-off or spike is encountered at the leading and trailing edges of the focus control voltage as illustrated in waveform e. This causes defocus at the beginning of each trace, especially when a fast sweep rate is selected. In order to eliminate such visible defocus, expensive and complicated high frequency amplifier means having high frequency amplifying devices and frequency compensation networks are required.

Figure 3:
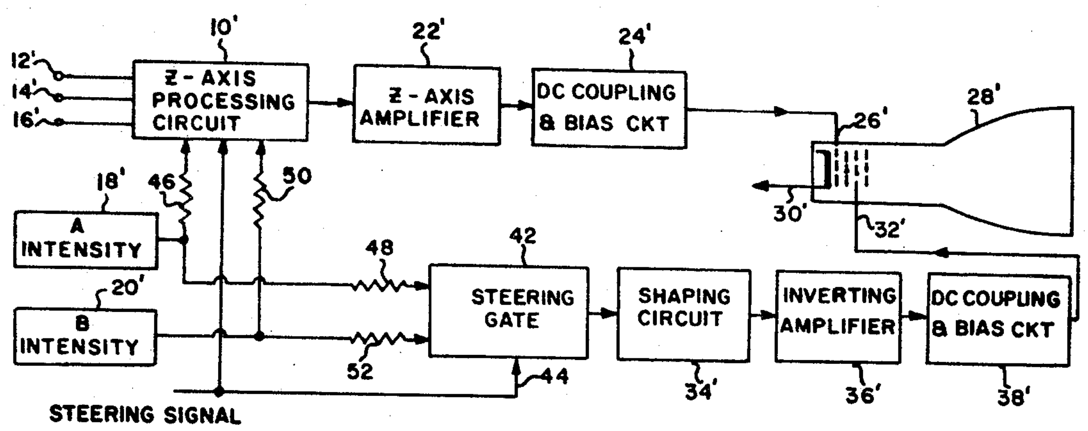
FIG. 3 is a block diagram of one embodiment of the automatic focus control circuit for a dual-trace oscilloscope according to the present invention.

FIG. 3 illustrates a block diagram of one embodiment of an automatic focus control circuit for a dual-trace oscilloscope according to the present invention, wherein a pair of independent sweep generators are provided. A z-axis processing circuit 10′, intensity control circuits 18′ and 20′, a z-axis amplifier 22′, a shaping circuit 34′ and an inverter amplifier 36′ are all similar to the corresponding circuits in FIG. 1. However, a steering gate circuit 42 is employed and modifications are made on DC coupling and bias circuits 24′ and 38′, which are described hereinafter in detail.

The steering gate circuit 42 transmits either A intensity level from the A intensity control circuit 18′ or B intensity level from the B intensity control circuit 20′ to the shaping circuit 34′ through resistors 48 and 52 respectively under control of a steering signal transmitted through a line 44. The A and B intensity levels are also transmitted to the Z-axis processing circuit 10′ through resistors 46 and 50 respectively. Although the steering signal is discussed in greater detail hereunder regarding FIG. 5A, it may be derived from a bistable multivibrator triggered by the A and B gate signals. Thus, the focus control signal is derived directly from the A and B intensity control circuits 18′ and 20′ rather than from the Z-axis amplifier 22′. The steering signal is also transmitted to the Z-axis processing circuit 10′ to determine which intensity levels should be processed.

Figure 4:
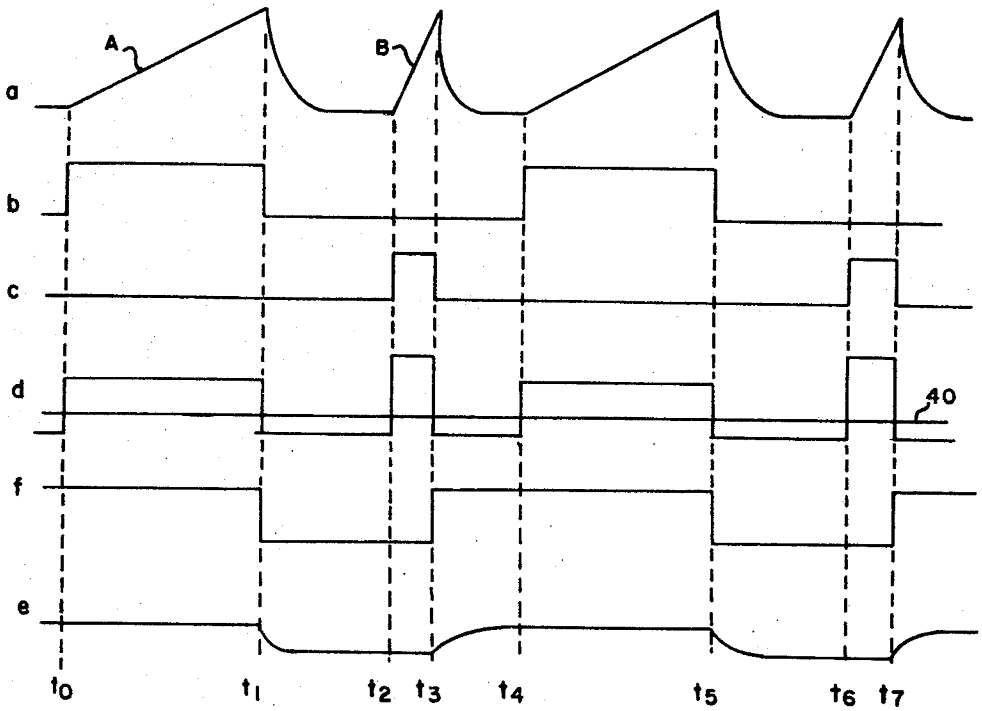
FIG. 4 shows waveforms for illustrating the operation of the present automatic focus control circuit exemplified in FIG. 3.

FIG. 4 illustrates waveforms for explaining the operation of the present automatic focus control circuit exemplified in FIG. 3. Waveforms *a*, *b*, *c* and *d* correspond respectively to the respective waveforms *a*, *b*, *c* and *d* in FIG. 2. However, the steering signal to be applied to the steering gate circuit 42 and the Z-axis processing circuit 10′, as shown as waveform f, is obtained from the bistable multi-vibrator triggered by the A and B gate signals as shown in FIG. 4 as waveforms b and c. It is to be understood from waveform f in FIG. 4 that the steering signal remains at one stable state during the time interval *t*3-*t*5 or immediately after the termination of the B gate signal until the termination of the A gate signal. Similarly, the steering signal remains at the other stable state during the time intervals *t*1-*t*3 and *t*5-*t*7. As a result, the focus voltage for a selected sweep is applied in advance when the blanking period of the previous sweep is started to eliminate the transient response and signal delay of the circuits 34′ and 36′.

As the steering gate circuit 42 transmits to the shaping circuit 34′, either the A intensity level or the B intensity level and no intermediate level therebetween, the focus voltage applied to the focus electrode 32' will be as illustrated as waveform *e* in FIG. 4. The focus voltage will be the real optimum value throughout the entire periods *to*-*t*1, *t*2-*t*3, *t*4-*t*5 and *t*6-*t*7 when either the A or the B sweep generator generates the ramp signal. This eliminates all the effects of signal delay and transient phenomena due to the amplifiers 34' and 36' even if a slow response amplifier may be employed. Therefore, a slower response amplifier of, for example, 300 ns can be utilized therefor.

Figure 5A:
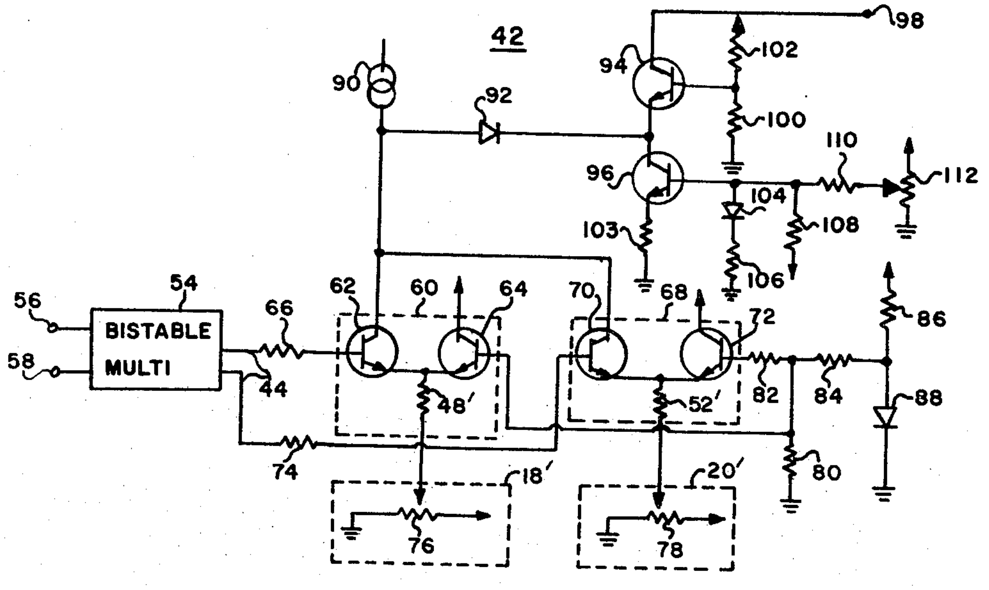
FIGS. 5A and 5B are circuit schematics of an important portion of the present invention.

FIGS. 5A and B show circuit diagrams of one example of the steering gate circuit 42 and the remaining portions of the automatic focus control circuit of FIG. 3 respectively. In FIG. 5A, a bistable multivibrator 54 receives input trigger signals at input terminals 56 and 58. The input trigger signals are derived, for example, by differentiating the A and B gate signals as illustrated in FIG. 4 to provide waveforms *b* and *c*, respectively. The outputs from the bistable multi-vibrator 54 are applied to one input terminal of an AND gate 60 consisting of a pair of transistors 62 and 64, through a resistor 66 and to one input terminal of an AND gate 68 consisting of a pair of transistors 70 and 72 through a resistor 74. The pair of outputs from the bistable multivibrator 54 are of different polarity from each other. Alternatively, a NAND gate can be employed in place of the AND gate 68, which receives the same input signal as the AND gate 60.

The commonly connected emitters of the transistors 62 and 64 and of the transistors 70 and 72 are connected to the A and B intensity control circuits 18' and 20' through coupling resistors 48' and 52'. The A and B intensity control circuits 18' and 20' preferably consist of potentiometers 76 and 78 whose fixed terminals are connected between ground and a suitable negative voltage source, for example, of −15V. The bases of the transistors 64 and 72 are connected to a bias circuit network including resistors 80, 82, 84 and 86 and a diode 88. Thus, the transistors 64 and 72 are carrying a certain current because they are biased in a conducting state. The collectors of the transistors 62 and 70 are commonly connected to a current source 90 and to an output circuit including a pair of transistors 94 and 96 through a coupling diode 92. The collector of the transistor 94 is connected to an output terminal 98 to be connected to the shaping circuit 34'. The base of the transistor 94 is connected to a voltage divider including resistors 100 and 102 for providing a suitable bias to the transistor 94. The common connection of the transistors 94 and 96 is connected to the cathode of the coupling diode 92. The emitter of the transistor 96 is returned to ground through a resistor 103. On the other hand, the base of the transistor 96 is connected to a bias network comprising a diode 104, resistors 106, 108 and 110 and a potentiometer 112. The transistor 96 and the associated circuit components operate as a limiter for ocntrolling the maximum current flowing out of the output terminal 98 by adjusting the center tap of the potentiometer 112.

During the time intervals *to*-*t*1 and *t*3-*t*5 when the A sweep generator is generating the ramp signal or more correctly when the steering signal as illustrated as waveform f in FIG. 4 is at a high stable state, the transistor 62 is rendered conductive and a current flows which is responsive to the setting of the potentiometer 76 or the A intensity control circuit 18'. At the same time, the transistors 70 and 72 are rendered nonconductive and conductive respectively. Thus, the output current from the transistor 94 is calculated by the subtraction of the sum of the collector currents of the transistors 62 and 96 from the current source 90. Similarly, during the intervals *t*1-*t*3 and *t*5-*t*7 when the bistable multivibrator 54 is at a low stable state, the transistor 70 carries a current which is responsive to the setting of the potentiometer 78 or the B intensity control circuit 20'.

Figure 5B:
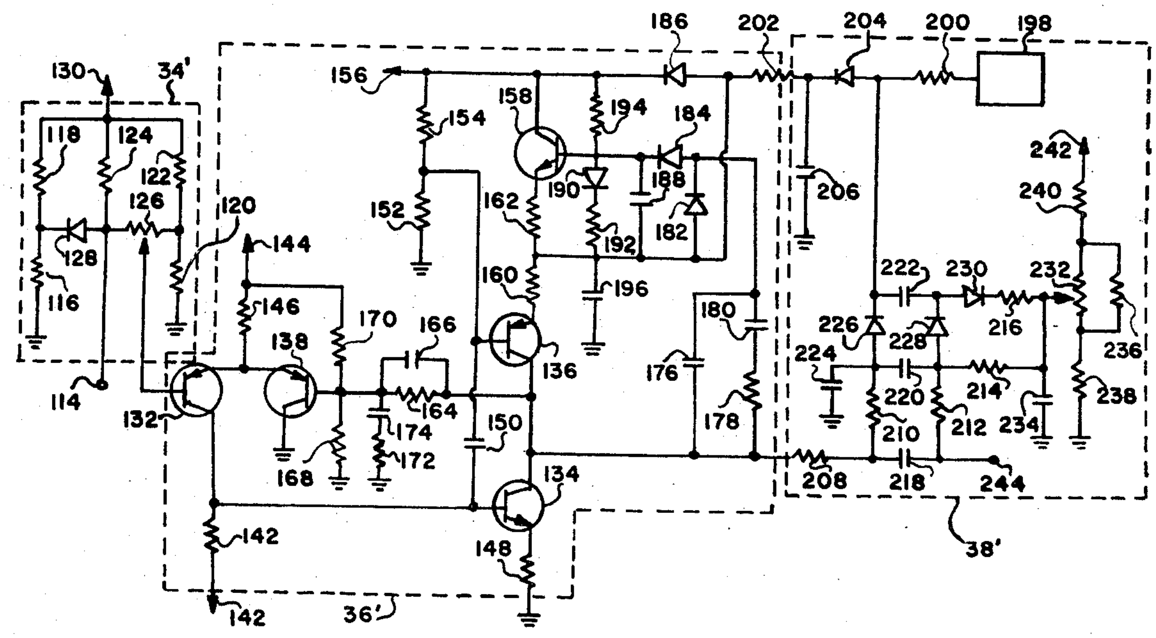

In FIG. 5B which illustrates a circuit schematic of an important portion of FIG. 3, especially the shaping circuit 34', the inverting amplifier 36' and the DC coupling and bias circuit 38', an input terminal 114 is connected to the input terminal of the shaping circuit 34' to receive the current from the output terminal 98 of FIG. 5A. The shaping circuit 34' consists of a network including resistors 116, 118, 120, 122 and 124, a potentiometer 126 and a diode 128. The common junction of the resistors 118, 122 and 124 is connected to a suitable positive voltage source 130. As the resistive values of the resistors 116, 118, 120 and 122 forming a pair of voltage dividers are selected such that the diode 128 remains conductive when the collector current of the transistor 94 through the terminal 114 is less than a predetermined value, the collector current of the transistor 94 is mainly supplied from the positive voltage source 130 through the resistors 118, 122 and 124 rather than the input of the inverting amplifier 36' including transistors 132, 134, 136 and 138 and associated circuit components. However, as the collector current of the transistor 94 increases, the voltage at the common junction of the resistor 124 and the potentiometer 126 decreases accordingly. As a result, the dynamic resistance of the diode 128 changes nonlinearly in order to obtain the nonlinear characteristic of the focus control voltage which is discussed hereunder in detail according to FIG. 6.

The base of the transistor 132 is connected to the movable tap of the potentiometer 126 to supply the base current to the terminal 114. The collector of the transistor 132 is returned to a suitable negative voltage source 140 through a resistor 142, and also connected to the base of the transistor 134. The emitter of the transistor 132 is connected to a suitable positive voltage source 144 through a resistor 146. The emitter of the transistor 134 is returned to ground through a resistor 148 and the collector thereof is commonly connected with the collector of the transistor 136 which operates as a constant current source. The base of the transistor 136 is connected to the base of the transistor 134 through a capacitor 150 and also to the common junction of a pair of resistors 152 and 154 which form a voltage divider for supplying a suitable bias voltage to the base of the transistor 136. The resistors 154 and 152 are connected between a suitable high DC voltage source 156 and ground. The emitter of the transistor 136 is connected to the emitter of a transistor 158 through resistors 160 and 162. The collector of the transistor 158 is also connected to the high DC voltage source 156. The transistor 138 whose base is connected to the common collectors of the transistors 136 and 134 through a parallel combination of a resistor 164 and a capacitor 166 and whose emitter is commonly connected with the emitter of the transistor 132 constitutes a negative feedback circuit for feeding back the output signal at the collector of the transistor 134 to the emitter of the transistor 132. The collector of the transistor 138 is returned to ground. The base of the transistor 138 is also connected to the common junction of a pair of resistors 168 and 170 for applying the bias voltage thereto. Resistor 170 is connected to voltage source 144 while resistor 168 is connected to ground. A series combination of a resistor 172 and a capacitor 174 is connected across the resistor 168. The resistors 168 and 170 work not only as a bias circuit for the transistor 138 but also as an attenuator circuit for the feedback circuit together with the resistors 164 and 172 and the capacitors 166 and 174.

When the current flowing in the terminal 114 is not large enough, the positive voltage source 130 supplies the current through the resistor 118 and the diode 128 among other paths as mentioned above. Thus, the base current of the transistor 132 remains at a small value. The emitter current of the transistor 132 is also a small value. This develops a small voltage drop across the collector load resistor 142 of the transistor 132. Consequently, the output voltage at the collector of the transistor 134 is high. However, if the dynamic resistance of the diode 128 increases because of the increased current flowing through the terminal 114, the decreased current through the resistor 118 and the diode 128 must be compensated by increasing the base current of the transistor 132. By selecting the resistors 118, 122 and 124, the nonlinear characteristic of the shaping circuit 34' may be adjusted to the optimum condition. If the movable tap of the potentiometer 126 is moved, the focus control voltage is also changed to change the focus voltage control curve which will be discussed hereunder according to FIG. 6. When the intensity level changes at low frequencies, the transistor 136 applies a constant collector load to the transistor 134 which is determined by the grid bias of the transistor 136. However, at high frequencies or at instances when the intensity level is switched from one level to another, the capacitor 150 transmits transient signals to the base of the transistor 136 to change the load impedance of the transistor 134 for accelerating the operation thereof.

The voltage bias at the emitter of 136 is set by the voltage divider consisting of resistors 154 and 152 at the base of transistor 136. The current bias in transistors 136 and 134 is determined primarily by the current in transistor 158. The current in transistor 158 varies according to the frequency and peak-to-peak voltage amplitude at collector of transistor 134. This is accomplished by the rectification by diodes 182 and 184 of the displacement current passed through the capacitor 176. The capacitor 188 filters this current and the resulting direct current component flows through resistor 192 in parallel with resistor 194 to bias the transistor 158 on in proportion to the previously mentioned displacement current. The diode 190 matches junction voltage of the transistor 158. The ratio of the parallel resistance of the resistors 192 and 194 to the resistor 162 sets the gain of this current bias circuit. This gain is made equal to the ratio of total load capacitance of the transistors 134 and 136 to the capacitance of the capacitor 176 to provide proper bias current in the transistor 136. The resistor 178 and the capacitor 180 are scaled by this same gain value to the load components of the resistor 210 and the capacitor 224. This provides necessary additional bias current in the transistors 136 and 134 for driving this latter load.

An AC high voltage source 198, which is typically part of the high voltage CRT power supply, is connected to the anode of the diode 204 through a large valued resistor 200. Resistor 202 connects to resistor 160 to obtain a positive bias voltage for the DC coupling and bias circuit 38'. Capacitor 206, connected from the cathode of the diode 204 to ground, provides filtering of the rectified signal delivered from the source 198.

The signal current from the collector of the transistor 134 is transmitted to the DC coupling and bias circuit 38' through a resistor 208. The DC coupling and bias circuit 38' consists of resistors 210, 212, 214 and 216, capacitors 218, 220, 222 and 224 and diodes 226, 228 and 230. The common junction of the capacitor 222 and diode 226 is connected to the common junction of the resistor 200 and diode 204 to receive the AC high voltage from the AC high voltage source 198. The common junction of the resistors 214 and 216 is connected to a movable tap of a potentiometer 232 and to a capacitor 234 which is returned to ground. Across the fixed terminals of the potentiometer 232, a resistor 236 is connected. One terminal of the potentiometer 232 is returned to ground through a resistor 238 while the other terminal thereof is connected to a high negative voltage source 242 through a resistor 240. This high negative voltage source 242 is normally connected to the cathode 30' of the cathode ray tube 28'. The common junction of the resistor 212 and the capacitor 218 is connected to an output terminal 244 which is connected to the focus electrode 32' of the cathode ray tube 28'. The voltage at the movable tap of the potentiometer 232 is selected at approximately −2,000 v.

The capacitor 224 is charged up by the current from the collector of the transistor 134 through the resistors 208 and 210. If the current through the resistors 208 and 210 varies slowly compared with the time constant of the capacitor 224 and the resistors 208 and 210, the voltage across the capacitor 224 follows the current. Thus, the voltage across the capacitor 224 is superimposed with the negative voltage developed across the capacitor 234 and transmitted to the output terminal 244 through the resistor 212. However, high frequency components are transmitted to the output terminal 244 through the capacitor 218. As the resistor 200 has a high resistive value, the charge stored in the capacitor 224 does not discharge significantly through the diode 226 even if the AC high voltage source 198 generates negative voltage.

The conventional DC coupling and bias circuit does not include the resistors 210 and 212 and capacitors 218 and 224. The input and output terminals are connected to the common junctions of the capacitor 220 and diode 226 and of the capacitor 220 and diode 228 respectively. This conventional circuit has various disadvantages including large ripple due to the pulsation of the AC high voltage source 198, breakdown of the diodes 226 and 228 and a large capacitive load for the inverting amplifier 36'. The present DC coupling and bias circuit 36', however, eliminates these disadvantages of the conventional circuit.

Figure 6:
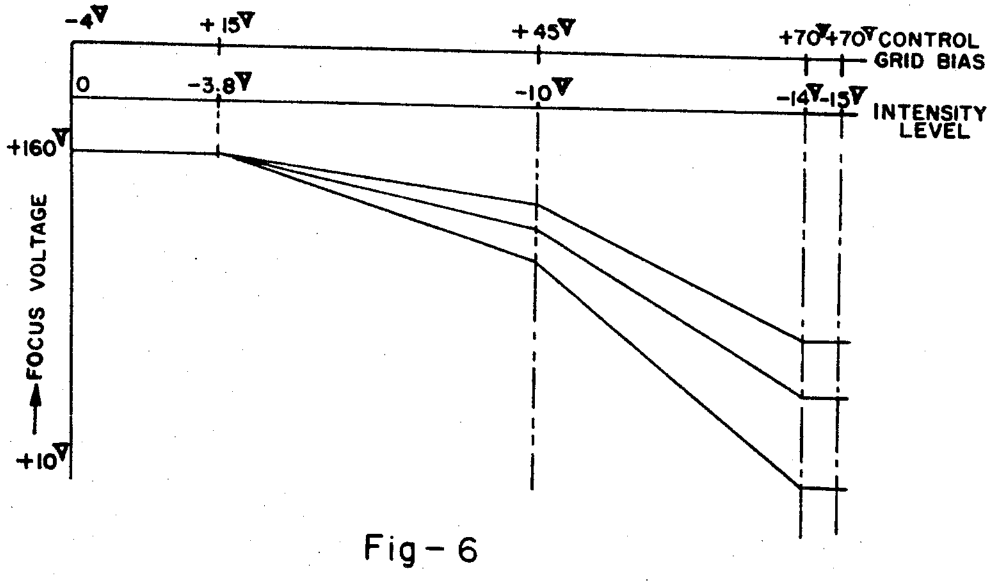
FIG. 6 illustrates the characteristic of the focus voltage against the intensity control and the control grid bias voltage.

FIG. 6 shows one example of the focus control voltage derived at the output terminal of the inverting amplifier 36' against the intensity control level and the control grid bias voltage of the cathode ray tube 28'. The intensity control represents the voltage at the movable terminal of the potentiometers 76 and 78 in FIG.

5A. The control grid bias voltage is the voltage difference between the control grid 26' and the cathode 30' of the cathode ray tube 28', wherein the negative symbol means bias voltage lower than the cut-off of the electron beam. The focus voltage at the collector of the transistor 134 remains unchanged at about +160 volts when the intensity control is set below approximately −3.8 volts because the constant current source 90 and the current through the transistor 96 are selected such that no current flows through the transistor 94. Until the intensity control is further increased to, for example, −10 volts, the dynamic impedance of the diode 128 remains at a low value, resulting in considerable decrease of the focus voltage. However, the diode 128 is rendered nonconductive when the intensity control is increased to a position adjacent the maximum position. Thus, the focus voltage is decreased at higher rate because of high gain of the amplifier. It should be noted that the focus voltage curve varies when the potentiometer 126 is controlled within the entire range so that the optimum focus voltage is derived for different cathode ray tubes. The focus voltage is then superimposed with the DC bias voltage controlled by the potentiometer 232. If the intensity control is increased still further, the focus voltage remains unchanged because all the current of the transistor 94 flows through the transistor 96 whose current is determined by the limiter 112. Although it is not explained in detail, the control grid bias is also limited at 70 volts.

Figure 7:
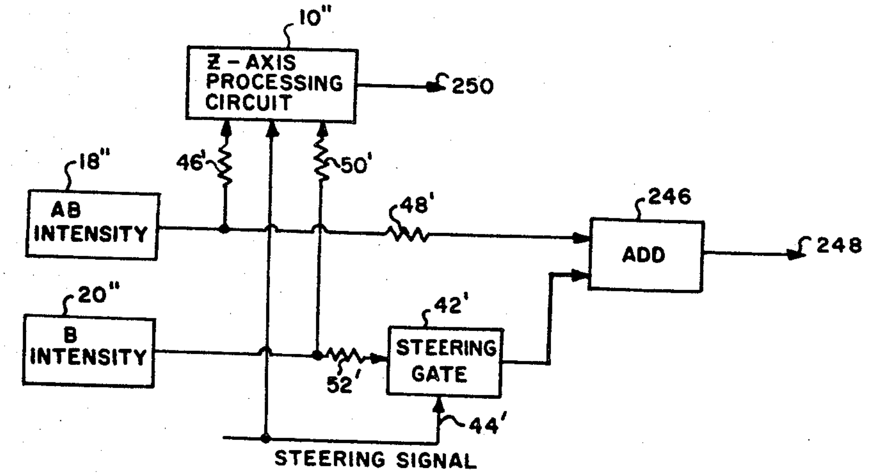
FIG. 7 is a block diagram illustrating an important portion of another embodiment of the present invention.

FIG. 7 is a block diagram illustrating an important portion of another embodiment of the present invention. In some applications, such, for example, as a delay sweep oscilloscope, the B sweep generator always generates a faster ramp signal than the A sweep generator. In such a case, it is desirable to control both A and B intensity levels simultaneously by a single intensity control and the B intensity level is controlled independently if there is any detectable differences in intensity between the two traces. This embodiment is especially designed for such application.

An AB intensity control circuit 18'' provides a controllable intensity level to the Z-axis processing circuit 10'' and an ADD circuit 246 through resistors 46' and 48' respectively. The AB intensity control circuit 18'' provides a controllable intensity level to the Z-axis processing circuit 10'' and a steering gate 42' through resistors 50' and 52' respectively. The steering gate 42' transmits the B intensity level to the ADD circuit 246 under the control of a steering signal like waveform f in FIG. 4 supplied through a control line 44'. When the B intensity control level is set to zero, both of the A and B traces are displayed by the same control grid bias voltage. However, the visual intensity of the A and B traces may not be identical because of the differences in time of the electron beam impinging the phosphor area of the cathode ray tube on which each trace is displayed. When the B intensity control circuit 20'' is set to a certain value, the B intensity level from the B intensity control circuit 20'' is transmitted to the ADD circuit 246 during the blanking period of the A sweep generator and the unblanking period of the B sweep generator. Accordingly, both of the AB intensity control signal and the B intensity control signal are added together by the ADD circuit 246 and applied to the shaping circuit 34' through a terminal 248 whenever the B trace is displayed. The B intensity control signal does not have any effect on the A trace. Similarly, the Z-axis processing circuit 10'' processes the AB intensity signal and the B intensity signal. The output from the Z-axis processing circuit 10'' is then applied to the Z-axis amplifier 22' through a terminal 250.

According to another embodiment of the present invention as illustrated in FIG. 7, it is frequently less complicated to obtain the same visual intensity for both traces of wider sweep rate range especially when the A and B sweep generators are generating sweep signals of a predetermined relationship. Thus, the latter embodiment is preferably for a delay sweep oscilloscope, wherein the B sweep generator is energized by the A sweep generator after a controllable delay time and also at a faster sweep rate than the A sweep generator so that one portion of the A trace will be displayed at a magnified time base. On the other hand, the former embodiment as shown in FIG. 3 is suitable for an oscilloscope including a plurality of independent time bases or sweep generators.

Although the above description is made with regard to preferred embodiments of the present invention, various modifications can be made for those skilled in the art without departing from the spirit and scope of the present invention.

What is claimed is:

1. An automatic focus control circuit for a cathode ray oscilloscope including an electrostatic focusing cathode ray tube for displaying sequentially a plurality of traces which have correspondingly different control grid voltages for controlling intensity levels of said traces, comprising;

means for controlling intensity levels for said plurality of traces, means for applying bias voltage between cathode and grid electrodes of the cathode ray tube according to the intensity levels, and means for automatically controlling the focus voltage to a focus electrode of the cathode ray tube to the optimum value for the next trace after the termination of the preceding trace substantially before initiation of the next trace and until the termination of that next trace.

2. An automatic focus control circuit according to claim 1, wherein said means for automatically controlling the focus voltage includes a steering gate for sequentially sampling the intensity level for a selected trace immediately after the termination of the previous trace.

3. An automatic focus control circuit according to claim 1, wherein said means for controlling intensity level includes an independent intensity control circuit for each of said traces.

4. An automatic focus control circuit according to claim 1, wherein said means for controlling intensity level includes a common intensity control circuit for uniformly controlling the intensity of one of said traces as well as all of the other traces, and an intensity control circuit for each of said other traces for compensating for the differences in intensity from said one trace.

5. An automatic focus control circuit according to claim 2, wherein said means for automatically controlling the focus voltage further includes:

shaping means for nonlinearly shaping the output from said steering gate to obtain the optimum focus voltage in response to each intensity level, amplifier means for amplifying the output from said shaping means, and DC coupling and bias means for superimposing a DC voltage with the output from said amplifier means.

6. An automatic focus control circuit according to claim 5, wherein said amplifier means includes first, second and third transistors whose emitter-collector circuits are connected in series between a suitable voltage source and ground, collectors of said first and second transistors being commonly connected to the input of said DC coupling and bias means, the base of said second transistor being connected to a suitable bias source and also to the base of said first transistor through a capacitor, and the base of said third transistor being AC coupled to the common collectors of said first and second transistors.

7. An electrostatic focusing cathode ray tube circuit for alternatively forming a plurality of traces of independently controllable intensities and sweep rates comprising:

a constant voltage source to be applied to a cathode of the cathode ray tube, a plurality of intensity control circuits for controlling the intensity level of each trace, means for establishing the control grid voltage for the cathode ray tube for sequentially applying the outputs from said intensity control circuits under control of a sweep gate signal, and means for establishing the focus voltage of the cathode ray tube to the optimum value in response to the intensity level of a selected trace by sequentially obtaining the output from said intensity control circuits, said focus voltage for the selected trace being applied immediately after the termination of the preceding trace before initiation of the next selected trace until the termination of the selected trace.

8. A cathode ray tube circuit according to claim 7, wherein said means for establishing the control grid voltage and focus voltage each includes a DC coupling and bias circuit for superimposing a DC voltage relating to said constant voltage source applied to the cathode of the cathode ray tube.

9. A DC coupling and bias circuit for superimposing a high DC voltage with a controllable DC signal, comprising:

first resistor and diode connected in series with each other, second similar resistor and diode connected in series with each other, first, second and third capacitors connected between corresponding terminals of said first and second resistors and diodes, a fourth capacitor connected between the common junction of said first resistor and diode and ground, a third diode and third and fourth resistors serially connected across said second diode, an AC high voltage power supply connected to said first diode through a coupling resistor, input and output terminals connected to each terminal of said first capacitor, and a DC bias voltage connected to the common junction of said third and fourth resistors.

* * * * *